Jan. 26, 1965 L. R. OVERBY 3,167,566
RESOLUTION OF DL-TRYPTOPHANE AND $\ell\ell$-$\alpha$-PHENYLETHYLAMINE
Filed Oct. 18, 1961

SCHEMATIC PRODUCTION OF L-TRYPTOPHAN
SHOWING RECIPROCAL RESOLUTION OF INACTIVE MATERIALS BY RESOLVING AGENTS

I Resolution of Acetyl-DL-Tryptophan

II Resolution of $d\ell$-$\alpha$-Phenylethylamine

THE HEAVY ARROWS INDICATE PRECIPITATION OF THE LESS SOLUBLE DIASTEREOISOMERIC SALTS OF ACETYL-L-TRYPTOPHAN AND $\ell$-$\alpha$-PHENYLETHYLAMINE $\ell$B + 2DLA + M$^+$ → MDA + LA$\ell$B   LA$\ell$B + X$d$B → HX + 2$d\ell$B + LA MDA + M LA + $\ell$B → (21%) M$^+$ → $\ell$B + MLA ← M$^+$ (83%) ← LA$\ell$B
                                           ↑ (73%) M$^+$
                                   MLA + $d$B + $\ell$B (17%) M$^+$ ← LA$\ell$B + X$d$B
                                           H$^+$ DLA ← racemize ← MDA + MLA + $\ell$B $\ell$B + MLA → hydrolyze and neutralize → L-TRYPTOPHAN

KEY
- DLA — Racemic N-acetyl-DL-tryptophan.
- LA — N-acetyl-L-tryptophan.
- DA — N-acetyl-D-tryptophan.
- $d\ell$B — Racemic $d\ell$-$\alpha$-phenylethylamine.
- $\ell$B — $\ell$-$\alpha$-phenylethylamine.
- $d$B — $d$-$\alpha$-phenylethylamine.
- LA$\ell$B — Diastereoisomeric salt of $\ell$-$\alpha$-phenylethylamine and N-acetyl-L-tryptophan.
- MLA — salt of N-acetyl-L-tryptophan and an alkaline agent.
- MDA — salt of N-acetyl-D-tryptophan and an alkaline agent.
- X$d$B — salt of $d$-$\alpha$-phenylethylamine and an acidic agent.

Inventor
Lacy R. Overby
By Edmund Godula
Attorney

3,167,566
RESOLUTION OF DL-TRYPTOPHANE AND dl-α-PHENYLETHYLAMINE
Lacy R. Overby, Waukegan, Ill., assignor to Abbott Laboratories, North Chicago, Ill., a corporation of Illinois
Filed Oct. 18, 1961, Ser. No. 147,131
5 Claims. (Cl. 260—319)

This invention relates to the resolution of N-acetyl-DL-tryptophane to obtain L-tryptophane and other active components. In particular, it relates to a method which employs N-acetyl-DL-tryptophane and resolving agents obtained by reciprocal resolution of dl-α-phenylethylamine with N-acetyl-L-tryptophane.

L-tryptophane is an active essential amino acid which is desirably a component in amino acid preparations for parenteral administration. It is well known that protein hydrolysates prepared for nutritional therapy comprise a mixture of amino acids. It is also well known that hydrolysis of protein preparations under acid conditions decomposes L-tryptophane; therefore, it is a common practice to add to such a protein hydrolysate the optically inactive DL-tryptophane. The L-form of the DL acid is beneficially utilized by the body while the D-form is inert or may possibly be detrimental. It is preferred to add L-tryptophane rather than the DL-form to such hydrolysates, but L-tryptophane is not easily available and is very expensive. Therefore, it is desirable to find a method which will produce L-tryptophane easily, economically and in large yields.

Nutritional therapy is one of the more obvious uses of the optically active amino acid, but there are additional reasons why large, economical supplies of the active forms are desirable. Among such reasons is the requirement that both L- and D-configurations of tryptophane are necessary for studies of animal nutrition, enzyme actions, microbial metabolism, peptide synthesis and others.

The resolution of N-acetyl-DL-tryptophane to its optically active forms, also referred to as antipodes of the racemic mixture, has been practiced in the art. Such practice suffers from many disadvantages such as low yields, tedious crystallizations, expensive resolving agents and other problems.

It has been shown by du Vigneaud et al., "J. Biol. Chem." 96, 511 that when N-acetyl-DL-tryptophane is combined with an equivalent amount of d-phenylethylamine, the less soluble diastereoisomeric salt of N-acetyl-D-tryptophane and d-α-phenylethylamine was obtained in low yields by fractional crystallizations. The dextro form of the acid was then liberated from the diastereoisomeric salt with a strong base. In accordance with this scheme, one mole of an expensive and hard-to-obtain dextro base is required to produce one-half mole of the dextro acid.

It is, therefore, apparent that great advantages would accrue from a method for resolving N-acetyl-DL-tryptophane which provides an inexpensive resolving agent to complement the resolving action of smaller amounts of the expensive d-α-phenylethylamine. It is also apparent that an improved method results where means are provided to obtain large supplies of d-α-phenylethylamine by economical and simple steps. Because L-tryptophane is the more useful isomer it is highly important to provide economically large quantities of l-α-phenylethylamine.

It is, therefore, an object of this invention to provide an economic and simple means for resolving N-acetyl-DL-tryptophane and dl-α-phenylethylamine.

Another object of this invention is to produce L-tryptophane from readily available, optically inactive N-acetyl-DL-tryptophane by a method that employs the undesirable D-form in process steps to obtain the desired L-form.

Still another object of this invention is to provide a method of preparing large amounts of L-tryptophane by reciprocal resolution of optically inactive acetyl-DL-tryptophane with small amounts of l-α-phenylethylamine.

A still further object of this invention is to provide a method for obtaining large amounts of the resolving agent, l-α-phenylethylamine by reciprocal resolution of dl-α-phenylethylamine with small amounts of acetyl-L-tryptophane.

Accordingly, it has been found that by complementing the action of the antipodes with optically inactive acid or base important advantages are realized. Optically inactive complementary agents are taken to mean acids or bases that are molecularly symmetrical and thereby nonresolvable, thus excluding racemic mixtures.

It has now been found that various salts are formed by reacting one equivalent of the optically inactive acid, N-acetyl-DL-tryptophane, hereinafter designated as DL-A (see flow sheet in drawing), with one-half equivalent of the levo-active base of α-phenylethylamine, hereinafter designated as lB, in a solvent containing one-half equivalent of an optically inactive alkaline agent, hereinafter designated as $M^+$. The least-soluble salt, LAlB crystallizes out of solution and is subsequently decomposed with an alkaline agent containing a cation ($M^+$) to obtain the salt MLA. This latter form is hydrolyzed and then neutralized to obtain the desired L-tryptophane. The active base lB may be recovered and employed again in the reaction. The more soluble MDA remaining in the filtrate from the LAlB crystallization is then racemized to give DLA which is, thereafter, resolved to give additional LA. By this process all the DLA is eventually converted to LA.

A key to the successful production of LA is a plentiful supply of lB. In order to obtain this active base, the practice of the process includes a reciprocal resolution wherein the active acid, LA, is used to resolve the dl base to obtain the active lB compound which is subsequently used for further resolution. This reciprocal resolution is conducted by neutralizing a portion of MLA to LA, which is then combined with the dl-α-phenylethylamine or dlB. In the practice of this step, smaller amounts of optically active LA are employed to complement the easily available, optically inactive acid agents. Thus, the reaction is carried out with one-half equivalent LA and one equivalent dlB in a solvent containing one-half equivalent mineral acid (HX). The less-soluble LAlB crystallizes from solution leaving Xdb in solution. Treatment with an optically inactive base providing an alkali metal cation ($M^+$) decomposes LAlB and large amounts of MLA and lB are recovered. The collected salt MLA is hydrolyzed and neutralized to obtain the desired L-tryptophane. The active base LB is separated and employed for the reaction with N-acetyl-DL-tryptophane as described hereinbefore.

The process set out herein operates efficiently and in a surprising manner by utilizing optically inactive alkaline agents and acid agents to complement the resolving action of the antipodes. It will be obvious to the skilled practitioner that alkaline agents, by their inherent properties, will react with the acid tryptophane. Such optically inactive alkaline agents can be selected, for example, from alkali metal and alkaline earth metal hydroxides such as sodium and calcium hydroxide among others, from alcoholates such as sodium ethylate and others or from strong organic bases such as butylamine, dimethylamine, cyclohexylamine, tribenzylamine hydroxide and the like. It is further apparent that acid agents, by their inherent properties, will react with the base, dl-α-phenylethylamine. Among the optically inactive acid agents that can be used are mineral acids such as hydrochloric, sulfuric, nitric and the like and organic acids such as acetic and the like. In the actual practice of the invention it is preferred to utilize a strong alkali metal base as sodium hydroxide and a strong mineral acid as hydrochloric acid.

According to the foregoing process, a small amount of LA or lB can be employed to conveniently produce large quantities of L-tryptophane from N-acetyl-DL-tryptophane by the respective application of the reciprocal resolution of acid and base.

The attached schematic drawing sets out the process in operation. It will be understood more fully after considering the following examples which set out the practice of the invention in greater detail.

The following examples are presented to teach the method in operation, but it should be understood that said examples are not intended to be an exclusive illustration of the method.

*Example I*

N-acetyl-DL-tryptophane (246 gm., 1.0 mole) is dissolved in 500 cc. of hot N potassium hydroxide (.5 mole) in 95% ethanol. To the warm solution is added 60.5 gm. (0.5 mole) of l-α-phenylethylamine. The solution is cooled to room temperature. The formed diastereoisomeric salt of N-acetyl-L-tryptophane and l-α-phenylethylamine precipitates from solution and is collected in a yield of 134 gm. (73%). The product has a specific rotation of $[\alpha]_D^{25} = +17.80$. The filtrate is set aside for later treatment as described in Example II.

The collected salt is suspended in about 250 cc. of water and about 50 cc. of benzene. The mixture is made alkaline to phenolphthalein with sodium hydroxide. The aqueous phase is separated and washed with 50 cc. portions of benzene. The combined benzene extracts are washed with water and said water wash is combined with the aqueous phase. This aqueous phase contains the sodium salt of N-acetyl-L-tryptophane which is treated to obtain L-tryptophane as hereinafter described or is reserved for reciprocal resolution of dl-α-phenylethylamine as described in Example III. The benzene phase contains l-α-phenylethylamine which is separated by drying the benzene extracts and distilling through a short column. The aqueous phase containing N-acetyl-L-tryptophane is adjusted with three equivalents of hydrochloric acid until its acidity is 2N. The solution is refluxed for four hours, decolorized with carbon and evaporated to dryness under reduced pressure. The residue is extracted with 95% ethanol to separate L-tryptophane hydrochloride from the sodium chloride. The alcoholic solution is neutralized with ammonium hydroxide to precipitate L-tryptophane. The precipitated product is removed by filtration, washed with water and alcohol, then dried. The yield is 95% and the specific rotation is $[\alpha]_D^{25} = -31.2°$.

*Example II*

The filtrate reserved in Example I is evaporated to dryness, and the residue is dissolved in about 250 cc. of water. The residue comprises basic salts rich in N-acetyl-D-tryptophane and some diastereoisomeric salt of N-acetyl-L-tryptophane and l-α-phenylethylamine. The mixture is made basic to phenolphthalein with sodium hydroxide to decompose the small portion of the diastereoisomeric salt. The basic mixture is extracted with about 250 cc. of benzene to remove the liberated amine. The aqueous phase is decolorized with activated carbon and 150 cc. of acetic anhydride is added. The solution is seeded with N-acetyl-DL-tryptophane and kept at 40° C. overnight, whereupon N-acetyl-DL-tryptophane crystallizes from the solution in about a 92% yield. The mixture is chilled and the crystalline product is removed by filtration, washed with water and dried. Specific rotation $[\alpha]_D^{25}$ is zero, M.P. 205–206° C. The racemic N-acetyl-DL-tryptophane is set aside for further resolution by l-α-phenylethylamine.

*Example III*

The aqueous solution containing the sodium salt of N-acetyl-L-tryptophane as prepared in Example I is employed in this example to resolve dl-α-phenylethylamine. The aqueous solution is decolorized with activated carbon and acidified to pH 3 with hydrochloric acid. Following this neutralization, N-acetyl-L-tryptophane precipitates in a yield of 96%. The solid product is separated by filtration and washed with water. The specific rotation is $[\alpha]_D^{25} = +29.1°$.

The collected N-acetyl-L-tryptophane (123 gm.), (0.5 mole) is dissolved in 250 cc. of warm 95% ethanol. To this solution is added 0.5 mole of concentrated hydrochloric acid followed by 121 gm. (1.0 mole) of dl-α-phenylethylamine. The solution is seeded with LAlB crystals and allowed to crystallize at room temperature. The crystalline product is the diastereoisomeric salt of N-acetyl-L-tryptophane and l-α-phenylethylamine which is collected in a yield of 151 gm. (83%), having a specific rotation of $[\alpha]_D^{25} = +17.7°$. The diastereoisomeric salt is suspended in 25 cc. of water and 50 cc. benzene and the mixture is made alkaline with sodium hydroxide to phenolphthalein. The sodium salt of N-acetyl-L-tryptophane is obtained in the aqueous phase and l-α-phenylethylamine is present in the water-immiscible phase (benzene). The l-α-phenylethylamine in the benzene phase is recovered as an oil by following the procedural steps set out in Example I. The collected l-α-phenylethylamine has a boiling point of 185–187° C. and a specific rotation of $[\alpha]_D^{25} = -38.8°$ to $-39.3°$. The l-α-phenylethylamine collected in this example is reserved for further resolution of N-acetyl-DL-tryptophane as described in Example I. The sodium salt of N-acetyl-L-tryptophane is reserved for conversion to L-tryptophane as described in Example I, or re-used to resolve more dl-α-phenylethylamine.

The process set out in the foregoing examples is schematically represented in the attached drawing. By reference to such drawing, the advantages of the process become apparent. Under the subdivision designated 1, the initial step shows the combination of N-acetyl-DL-tryptophane, (DLA) l-α-phenylethylamine (lB) and an alkaline agent (M+). This combination produces the antipode salt MDA and the diastereoisomeric salt LAlB. The antipode salt MDA remains in solution with about 27% of the formed diastereoisomeric salt LAlB. The major portion of the less-soluble LAlB precipitates from solution as indicated by the heavy arrow. Treatment of the collected LAlB with an alkaline agent gives the antipode lB in an organic solvent phase and the antipode salt MLA in an aqueous phase. The antipode salt MLA is hydrolyzed and neutralized to provide the antipode, L-tryptophane or LA. The antipode lB is removed from the organic solvent phase and is reserved for the initial step as shown by the broken line.

To the solution containing the lesser portion of the diastereoisomeric salt LAlB and the antipode salt MDA from the first step is added an alkaline agent M+ to form the antipode lB and the antipode salts MDA and MLA. The antipode lB is removed by an organic solvent phase and reserved for the resolution of DLA. The antipode salts MDA and MLA are racemized in the aqueous phase to form DLA which is reserved for the initial step as shown by the broken arrow.

Subdivision ll of the drawing shows the reciprocal resolution of dl-α-phenylethylamine with one-half equivalents of the antipode LA and an optically inactive acid agent HX. The antipode LA is obtained by treating with an acid agent a portion or all of the antipode salt MLA prepared under Subdivision 1. The obtained antipode LA is then combined with the racemic dlB and acid agent HX to obtain the antipode salt XdB and the diastereoisomeric salt LAlB. The major portion of the less-soluble LAlB precipitates from solution as shown by the heavy arrow. The precipitated LAlB is then treated with an optically inactive alkaline agent M+ to form additional amounts of the antipode lB and the antipode salt MLA. The solution containing a smaller portion (17%) of the diastereoisomeric salt LAlB and the antipode salt XdB is treated with an optically inactive alkaline agent M+ to form the antipode salt MLA and the antipodes dB and lB.

By employing the reciprocal resolution of this method according to the examples and as shown in the schematic drawings, large quantities of L-tryptophane are obtained readily. Thus, by starting out with 60.5 gm. of the antipode l-α-phenylethylamine and a plentiful supply of the racemic compounds, N-acetyl-DL-tryptophane and dl-α-phenylethylamine, 12.5 kg. of acetyl-L-tryptophane and 8.6 kg. of l-α-phenylethylamine is realized after 17 reciprocal resolutions.

It will be apparent to the skilled practitioner in the art that the advantages of this method are easily adapted to a continuous process, in which small amounts of starting active material and large amounts of easily available inactive material are continuously manipulated by reciprocal resolution to obtain large amounts of the desired L-tryptophane. It is equally apparent that D-tryptophane, d-α-phenylethylamine and their derivatives can be obtained with the foregoing process steps when acetyl-D-tryptophane and d-α-phenylethylamine are used as the active agents to resolve the optically inactive acid and base.

The source of racemic tryptophane employed herein is N-acetyl-DL-tryptophane, but it will be apparent that other N-acyl derivatives of racemic tryptophane are equally operable in the process such as N-propionyl, N-butyryl, N-amylyl and the like. The foregoing acyl groups are easily removed by hydrolysis and neutralization following resolution of the racemic form.

This application is a continuation-in-part of co-pending application Serial No. 757,253 filed August 26, 1958, now abandoned.

Others may practice the invention in any of the numerous ways which will be suggested by this disclosure to one skilled in the art. All such practice of the invention is considered to be a part hereof provided it falls within the scope of the appended claims.

I claim:

1. In the resolution process wherein an optically active form of amine resolving agent and N-lower-alkanoyl-DL-tryptophane are reacted to obtain a diastereoisomeric salt of said tryptophane and amine agent which is then decomposed with a strong base to liberate the dextro tryptophane form from the diastereoisomeric salt the improvement comprising complementing the amine resolving agent by combining one equivalent of an optically inactive base with about two equivalents of N-lower alkanoyl-DL-tryptophane and about one equivalent of L-α-phenylethylamine to obtain diastereoisomeric salt which is capable of decomposition to yield the dextro tryptophane form.

2. In the process of resolving N-acetyl-DL-tryptophane wherein L-α-phenylethylamine is employed as a resolving agent the improvement comprising combining two moles of N-acetyl-DL-tryptophane with about one mole of optically inactive base capable of forming a soluble salt, and about one mole of said L-α-phenylethylamine to obtain a soluble product and an insoluble product, said soluble product essentially consisting of diastereoisomeric salts of N-acetyl-L-tryptophane and of N-acetyl-dextro tryptophane, said insoluble product essentially consisting of the diastereoisomeric salt of N-acetyl-L-tryptophane and L-α-phenylethylamine.

3. In the process of resolving DL-α-phenylethylamine wherein N-acetyl-L-tryptophane is used as a resolving agent the improvement comprising combining two equivalents of said amine with about one equivalent of said L-tryptophane and about one equivalent of optically inactive acid to form diastereoisomeric salt of N-acetyl-L-tryptophane and L-α-phenylethylamine, adding alkali to the formed salt to cause decomposition thereof to yield L-α-phenylethylamine and alkali salt of N-acetyl-L-tryptophane.

4. The process of claim 1 wherein said optically inactive base is alkaline metal hydroxide.

5. The process of claim 3 wherein said acid is mineral acid.

References Cited in the file of this patent

UNITED STATES PATENTS 2,797,226     Amiard et al.     June 25, 1957

OTHER REFERENCES

Du Vigneaud et al.: J. Biological Chem., vol. 96, pp. 511 (1932).

Hackh's Chemical Dictionary, 2nd Ed., Maple Press Co., 1937, page 21.